(12) United States Patent
Senatori et al.

(10) Patent No.: US 10,234,908 B2
(45) Date of Patent: Mar. 19, 2019

(54) HINGE ASSEMBLY FOR A COMPUTING DEVICE

(71) Applicant: HEWLETT-PACKARD DEVELOPMENT COMPANY, L.P., Houston, TX (US)

(72) Inventors: Mark Senatori, Houston, TX (US); Stephen DeSaulles, London (GB)

(73) Assignee: HEWLETT-PACKARD DEVELOMENT COMPANY, L.P., Spring, TX (US)

( * ) Notice: Subject to any disclaimer, the term of this patent is extended or adjusted under 35 U.S.C. 154(b) by 59 days.

(21) Appl. No.: 15/304,934

(22) PCT Filed: Apr. 29, 2014

(86) PCT No.: PCT/US2014/035824
§ 371 (c)(1),
(2) Date: Oct. 18, 2016

(87) PCT Pub. No.: WO2015/167451
PCT Pub. Date: Nov. 5, 2015

(65) Prior Publication Data
US 2017/0185110 A1    Jun. 29, 2017

(51) Int. Cl.
*G06F 1/16*    (2006.01)
*E05D 3/02*    (2006.01)
*E05D 7/00*    (2006.01)

(52) U.S. Cl.
CPC ............. *G06F 1/1681* (2013.01); *E05D 3/02* (2013.01); *E05D 7/00* (2013.01); *G06F 1/1616* (2013.01); *G06F 1/1624* (2013.01); *E05Y 2900/606* (2013.01)

(58) Field of Classification Search
CPC combination set(s) only.
See application file for complete search history.

(56) References Cited

U.S. PATENT DOCUMENTS

| 5,706,167 | A | 1/1998 | Lee |
| 7,725,988 | B2 | 6/2010 | Kim et al. |
| 7,903,400 | B1 | 3/2011 | Chen |
| 8,068,334 | B2 | 11/2011 | Tang |
| 8,200,300 | B2 | 6/2012 | Wang et al. |
| 8,248,772 | B2 | 8/2012 | Dai et al. |
| 8,300,394 | B2 | 10/2012 | Senatori |
| 8,347,461 | B2 | 1/2013 | Chen |
| 8,363,391 | B2 * | 1/2013 | Kim ..................... G06F 1/1616 361/679.01 |

(Continued)

FOREIGN PATENT DOCUMENTS

| CN | 101341455 | 1/2009 |
| CN | 102606616 | 7/2012 |

(Continued)

*Primary Examiner* — Victor D Batson
*Assistant Examiner* — Matthew J Sullivan
(74) *Attorney, Agent, or Firm* — HPI Legal Department (57) ABSTRACT

Examples disclosed herein provide a hinge assembly for a computing device. The binge assembly includes a sliding portion attached to a base member of the computing device, and a hinge pivotally connected to the sliding portion along an axis. The sliding portion moves from a first position along the base member to a second position along the base member when the hinge pivots around the axis.

14 Claims, 5 Drawing Sheets

(56) References Cited

U.S. PATENT DOCUMENTS

| | | |
|---|---|---|
| 8,385,057 B2 | 2/2013 | Liu et al. |
| 8,593,800 B2 * | 11/2013 | Asakura ................ G06F 1/1616 16/235 |
| 8,628,244 B2 * | 1/2014 | Hsu ..................... H04M 1/0237 16/362 |
| 8,789,242 B2 * | 7/2014 | Lin ....................... G06F 1/1616 16/362 |
| 2007/0082695 A1 * | 4/2007 | Yoon ................... H04M 1/0235 455/550.1 |
| 2007/0091552 A1 | 4/2007 | Liang et al. |
| 2007/0186380 A1 | 8/2007 | Kim et al. |
| 2008/0161075 A1 * | 7/2008 | Kim .................... H04M 1/0237 455/575.4 |
| 2011/0177850 A1 | 7/2011 | Griffin et al. |
| 2012/0098397 A1 | 4/2012 | Chang et al. |
| 2013/0176663 A1 | 7/2013 | Liao et al. |

FOREIGN PATENT DOCUMENTS

| | | | |
|---|---|---|---|
| FR | 2221746 | 10/1974 | |
| FR | 2221746 A1 * | 10/1974 | ........... G02C 5/2209 |
| JP | 2009071511 A | 4/2009 | |

* cited by examiner

HINGE ASSEMBLY FOR A COMPUTING DEVICE

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two members connected together at a common end. In most cases, a first or display member is utilized to provide a viewable display to a user while a second or base member includes an area for user input (e.g., touchpad and keyboard). In addition, the viewable display may be a touchscreen (e.g., touchscreen laptop), allowing the user to interact directly with what is displayed by touching the screen with simple or multi-touch gestures.

DETAILED DESCRIPTION

Many form factors exist for notebook computers. A common form factor includes hinges that connect the two members of the clamshell-type design at the common end. A challenge faced by manufacturers of notebook computers is allowing for clearance of the hinges or other moving parts as the notebook computer is opened and closed, without having to give up much space from the base member or display member to accommodate the hinges.

Examples disclosed herein provide a hinge assembly for a computing device, such as a notebook computer, that allows for simultaneous rotational and linear movement of the assembly as the notebook computer is opened and closed. The hinge assembly may allow for the base member and the display member of the notebook computer to be mounted flush against each other, without the need for large gaps or cuts in adjacent surfaces of the members to accommodate the hinge assembly.

In one example, a hinge assembly for a computing device can include a sliding portion attached to a base member of the computing device, and a hinge pivotally connected to the sliding portion along an axis. The sliding portion can move from a first position along the base member to a second position along the base member when the hinge pivots around the axis.

In another example, a computing device can include a base member, a hinge assembly, and a display member attached to the hinge assembly. The hinge assembly can include a sliding portion attached to the base member, and a hinge pivotally connected to the sliding portion along an axis. The sliding portion can move from a first position along the base member to a second position along the base member when the hinge rotates.

In yet another example, a hinge assembly for a computing device can include a sliding portion attached to a base member of the computing device, and a hinge pivotally connected to the sliding portion along an axis. The sliding portion can move from a first position along the base member to a second position along the base member when the hinge pivots around the axis. The hinge assembly can include a lever attached to the hinge and the base member via ball joints, wherein the ball joint attaching the lever to the hinge is fixed to the lever.

Figure 1A:
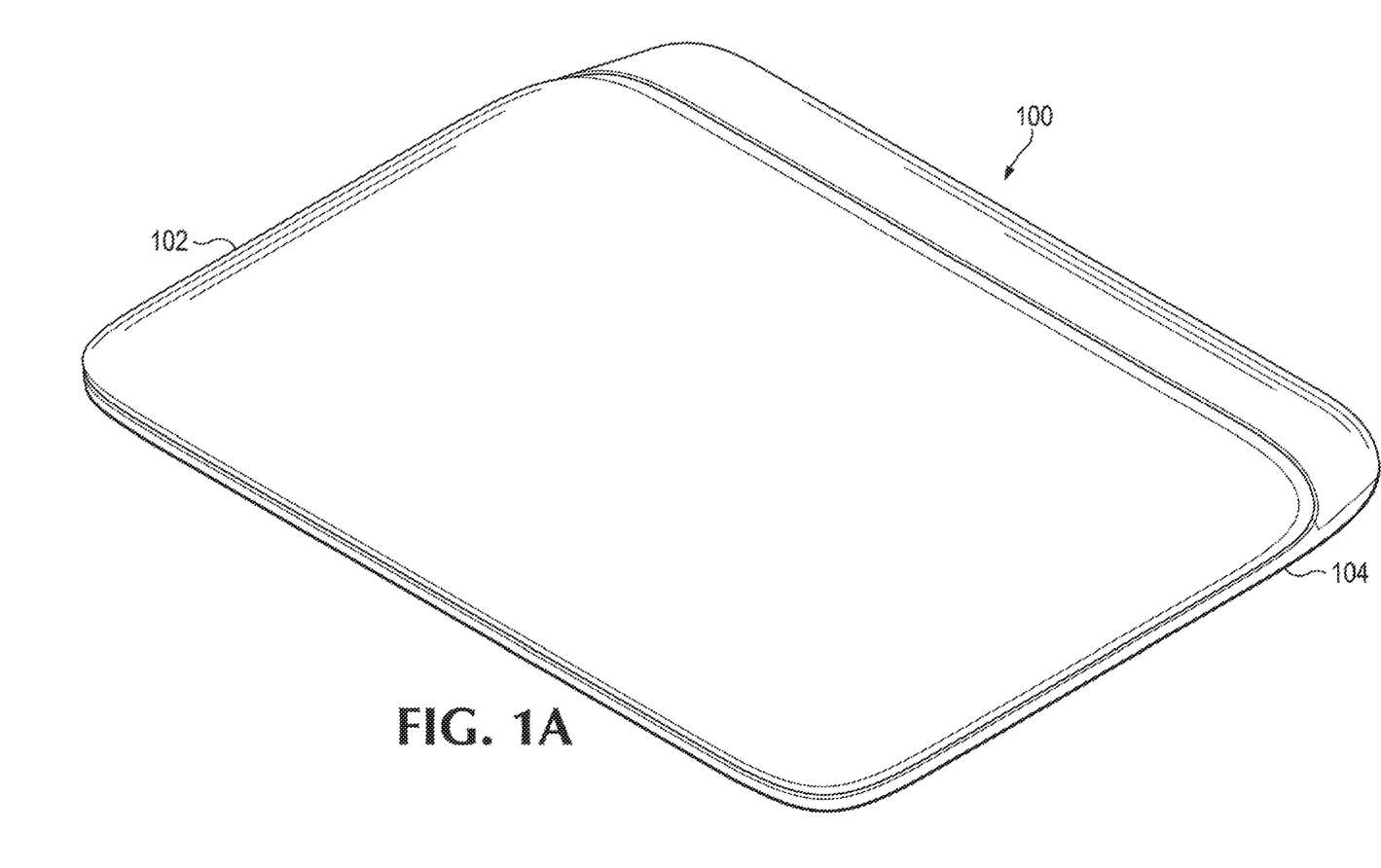
FIGS. 1A-B illustrate a computing device in a closed position, according to an example.

With reference to the figures, FIG. 1A illustrates a computing device 100, such as a notebook computer, in a closed position, according to an example. The computing device 100 includes a base member 104 and a display member 102 that may be joined together via a hinge assembly 110 (e.g., see FIG. 1B). As an example, the base member 104 includes an area for user input, such as a touchpad and a keyboard. The display member 102 includes a display screen for viewing the video output of the device 100, and may include input means for operation by a user, such as a touchscreen (e.g., the display screen may be the touchscreen).

Figure 1B:
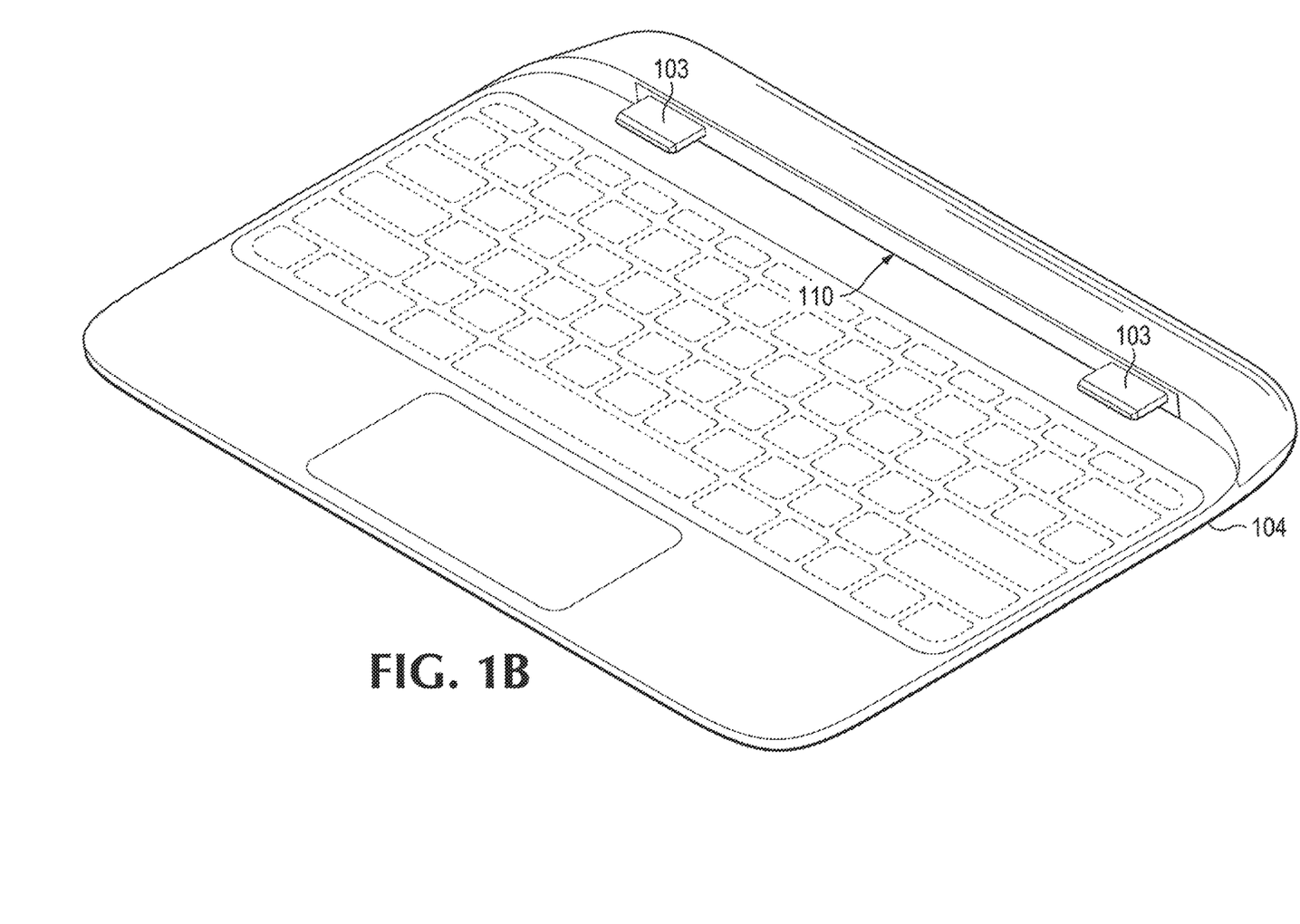

Notebook computers may include a feature that allows the device to be "converted" from one style of use to another style of use. For example, a notebook computer may be converted from a laptop mode, where the touchpad and keyboard of the base member is available to be used as input, to a tablet mode, where the display member may be detached from a hinge assembly and the display of the display member may be used for both viewing and input. Such devices that serve this dual purpose may be called convertible laptops. Referring to FIG. 1B, the display member 102 (not illustrated) may be detached from the hinge assembly 110. As an example, protrusions 103 from the hinge assembly 110 may be removed from cavities along a bottom sidewall of the display member 102 when it is detached from the hinge assembly 110.

Figure 2:
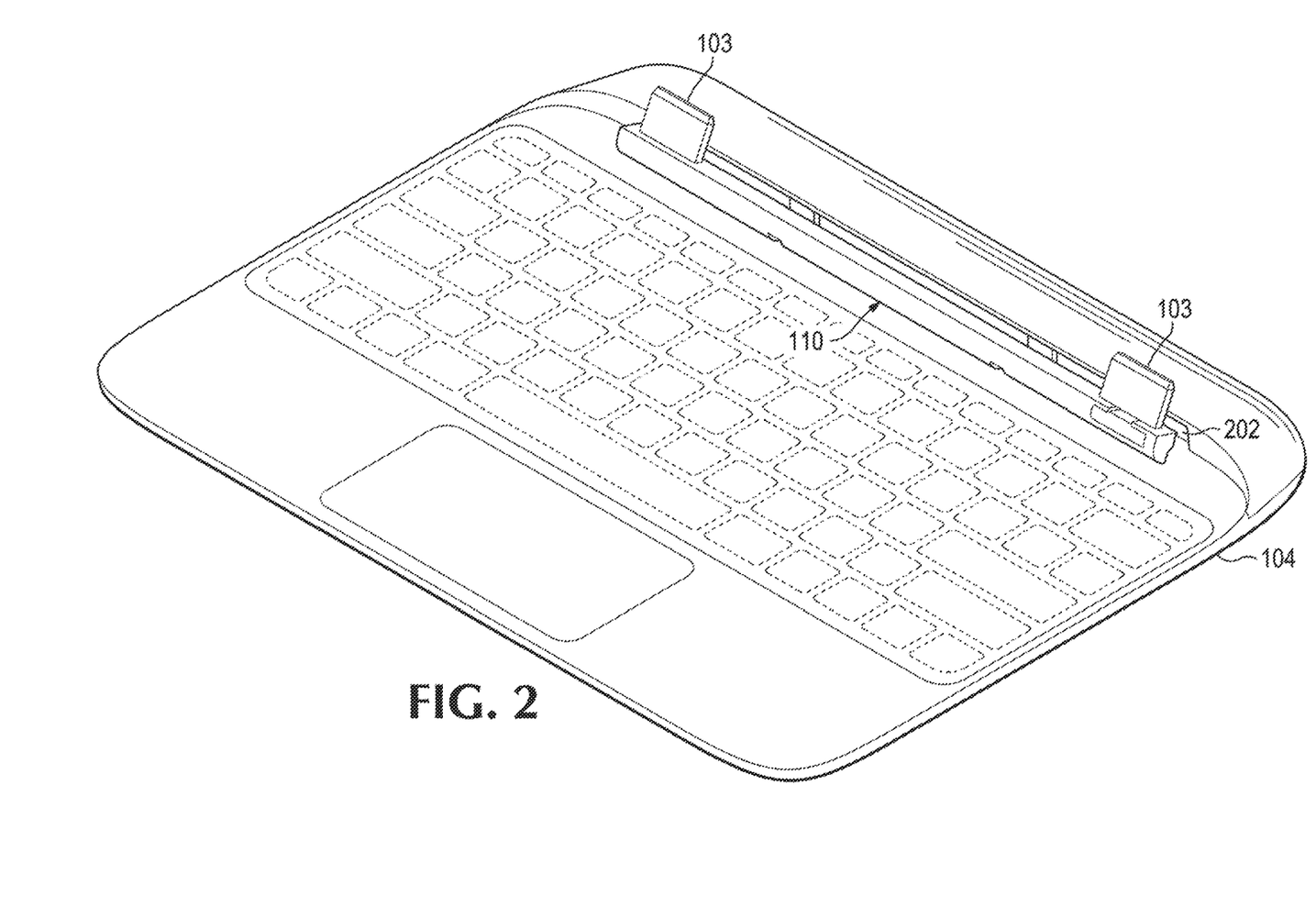
FIG. 2 illustrates the computing device of FIG. 1A in an open position, according to an example.

FIG. 2 illustrates the computing device 100 of FIG. 1A in an open position, according to an example. As the computing device 100 is opened (e.g., display member 102 is opened), the hinge assembly 110 may simultaneously move linearly as the hinge assembly 110 is rotated to open the computing device 100. The hinge assembly 110 may move linearly and emerge from a cavity 202 within the base member 104 as the display member 102 (not illustrated) is rotated to open the computing device 100. The hinge assembly 110 of the computing device 100 may allow for the display member 102 to be viewed at a variety of viewing angles, as will be further described.

As an example, the hinge assembly 110 may occupy the cavity 202 within the base member 104 when the computing device 100 is in the closed position (e.g., see FIG. 1B), concealing the hinge assembly 110 when the computing device 100 is not in use. The simultaneous rotational and linear movement of the hinge assembly 110 may allow for the base member 104 and the display member 102 to be mounted flush against each other (as illustrated), without the need for large gaps or cuts in adjacent surfaces of the members 102, 104 to accommodate the hinge assembly 110.

Figure 3:
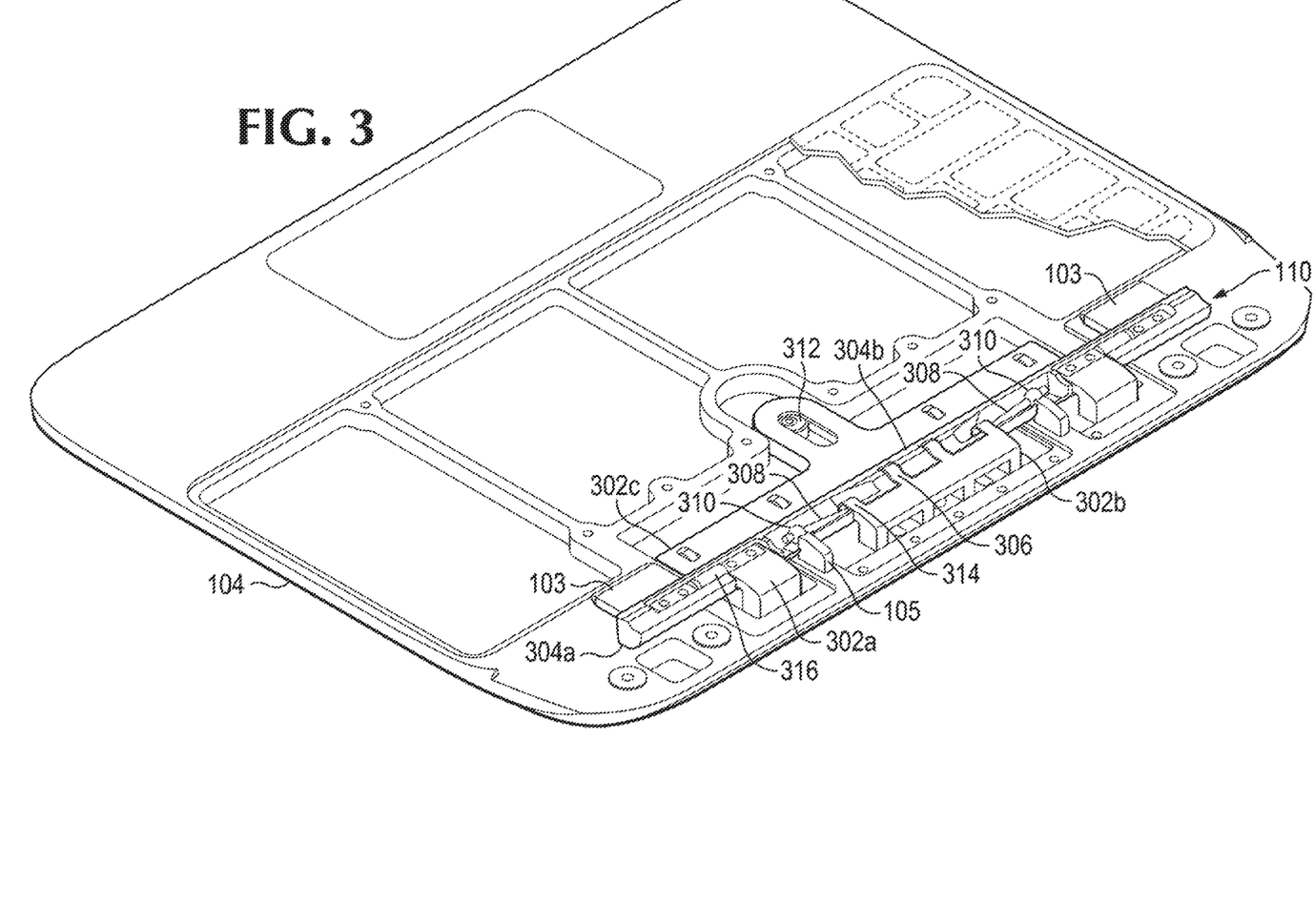
FIG. 3 illustrates components of a hinge assembly when the computing device is in the closed position, as illustrated in FIG. 1B, according to an example.

FIG. 3 illustrates components of the hinge assembly 110 when computing device 100 is in the closed position, as illustrated in FIG. 1B, according to an example. As an example, the hinge assembly 110 may include a sliding portion attached to the base member 104 and a hinge pivotally connected to the sliding portion along an axis. Referring to FIG. 3, portions of the sliding portion are referred to by reference numerals 302a, 302b, and 302c. However, the various portions 302a-c of the sliding portion may be one solid piece, and the sliding portion may be referred to by reference numeral 302. The sliding portion 302 may move linearly along the base member 104 via guide tracks disposed within the base member 104.

Referring to FIG. 3, the sliding portion 302 may move along the guide tracks via a guide wheel 312 pivotally connected to the base member 104, for example, via a shaft disposed and fixed within the base member 104. Other examples for moving the sliding portion 302 along the base member 104 include, but are not limited to, using linear bearings or frictionless rigid guide rails. Referring to FIG. 3, portions of the hinge pivotally connected to the sliding portion 302 are referred to by reference numerals 304a and 304b. However, the various portion 304a-b of the hinge may be one solid piece, and the hinge may be referred to by reference numeral 304. The hinge 304 may be pivotally connected to the sliding portion 302 at pivot point 306.

Figure 4:
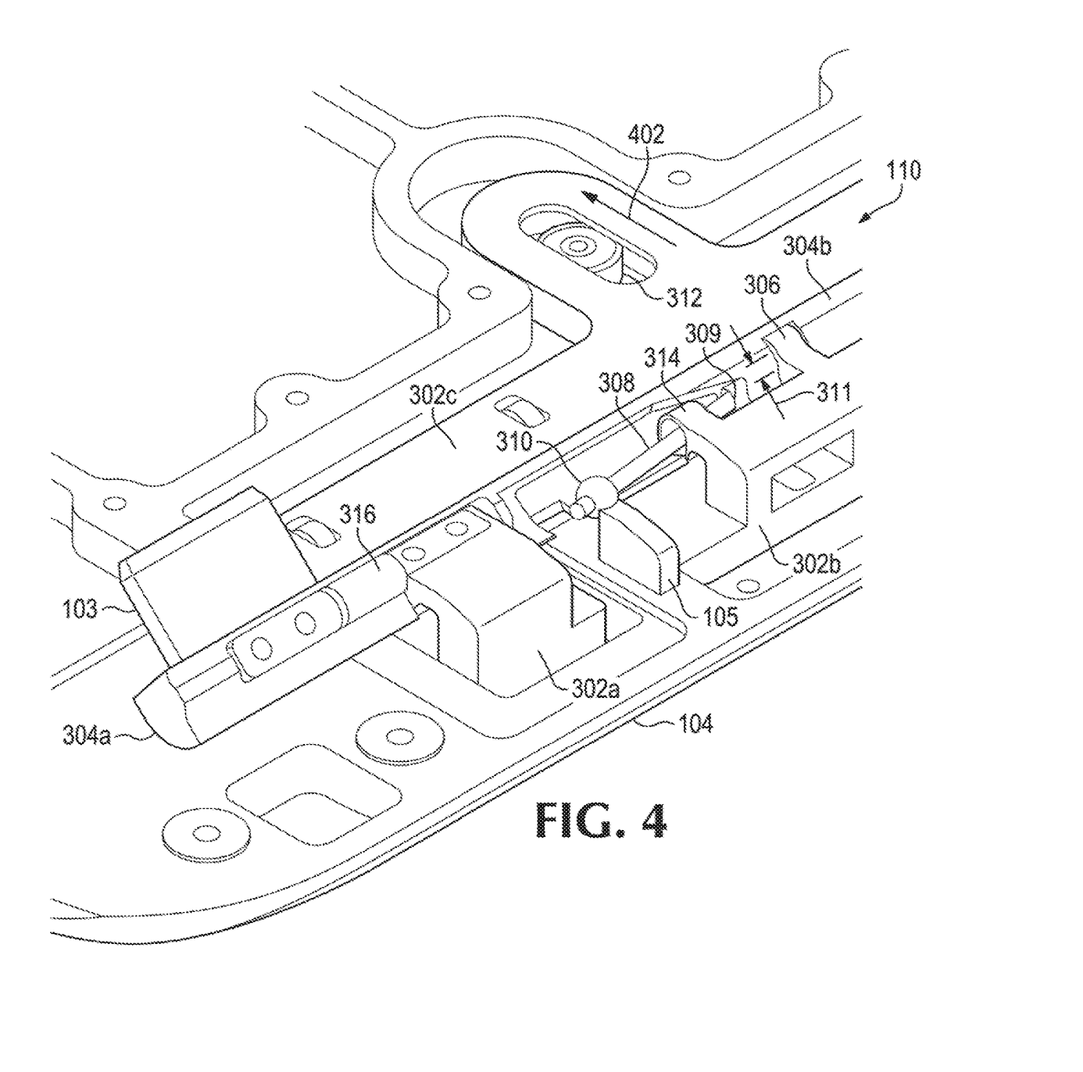
FIG. 4 illustrates components of the hinge assembly as the computing device is opened to the open position, according to an example.

FIG. 4 illustrates components of the hinge assembly 110 as the computing device 100 is opened to the open position, according to an example. The hinge assembly 110 may include friction hinges 316 that provide friction for resisting a torque provided by a user while opening or closing the computing device 100. As mentioned above, the hinge assembly 110 of the computing device 100 may allow for the display member 102 to be viewed t a variety of viewing angles. As an example, the friction hinges 316 may support the display member 102 at any desired open angle with sufficient resistance to allow, for example, touch screen computing.

As will be further described, the sliding portion 302 of the hinge assembly 110 may move linearly along the base member 104, when the hinge 304 pivots around an axis via pivot point 306 while the computing device 100 is opened or closed. As an example, as the computing device 100 is opened to the open position, the sliding portion 302 of the hinge assembly 110 may move from a first position (e.g., see FIG. 3) along the base member 104 to a second position (e.g., see FIG. 4) along the base member 104, with the direction of the movement indicated by arrow 402. Referring back to FIG. 2, the hinge assembly 110 may emerge from the cavity 202 as the display member 102 (not illustrated) is rotated to open the computing device 100. Similarly, the sliding portion 302 may move in a direction opposition to arrow 402 to conceal the hinge assembly 110 back within the cavity 202 as the display member 102 is rotated to close the computing device 100.

As an example, the hinge assembly 110 may include a lever 308 attached to the hinge 304 and a protrusion 105 of the base member 104. The lever 308 may be mounted to the hinge 304 (e.g., at 309) and the protrusion 105 via ball joints disposed along the lever 308. The ball joint (not illustrated) attaching the lever 308 to the hinge 304 at 309 may be fixed to the lever 308, while ball joint 310 attaching the lever 308 to base member 104 (e.g., via protrusion 105) may slide along lever 308 to account for differences in the arc the lever 308 makes, as will be further described. Referring to FIG. 4, the lever 308 may pass through an opening 314 of the sliding portion 302 disposed between the attachments the lever 308 makes with the hinge 304 and the protrusion 105 via the ball joints. As an example, the opening 314 may also have a ball joint or similar feature that allows the lever 308 to have multiple axes of movement.

Referring to FIG. 4, the lever 308 may be attached to the hinge 304 at an offset 311 from the pivoting axis of the hinge 304 (e.g., via pivot point 306). As a result, when the hinge 304 pivots around the axis or rotates via pivot point 306 while the computing device 100 is opened or closed, the end of the lever 308 attached to the hinge 304 at 309 may rotate in a circular motion around the axis of rotation of hinge 304. As the lever 308 rotates in the circular motion around the axis of rotation, the lever 308 may move about the opening 314 of the sliding portion 302, causing the ball joint 310 to push against the protrusion 105 of the base member 104 and move the sliding portion 302 in a linear motion. As a result, the placement of the lever 308 within the hinge assembly 110 may allow for simultaneous rotational and linear movement of the hinge assembly 110 as the computing device 100 is opened and closed.

As an example, the relationship of the rotational movement to the linear movement may not be linear. For example, the amount of linear movement of the sliding portion 302 of the hinge assembly may vary as the hinge 304 pivots via pivot point 306, according to variations of the profile of the opening 314. When the lever 308 rotates in the circular motion around the axis of rotation and moves about the opening 314, introducing variations in the profile of the opening 314 may allow for the amount of linear movement of the sliding portion 302 to be controlled.

As an example, as the computing device 100 is opened to the open position, ball joint 310 may push against protrusion 105, causing the sliding portion 302 of the hinge assembly 110 to move from a first position (e.g., see FIG. 3) to a second position (e.g., see FIG. 4), with the direction of the movement indicated by arrow 402. Similarly, the sliding portion 302 may move in a direction opposition to arrow 402 as the display member 102 is rotated to close the computing device 100. As the lever 308 is attached to the protrusion 105 of the base member 104, the lever 308 may move the hinge assembly back within the cavity 202 (e.g., see FIG. 2) as the lever rotates in the circular motion around the axis of rotation of the hinge 304. As described above, the ball joint 310 may slide along the lever 308 to account for the differences in the arc the lever 308 makes as it rotates in the circular motion around the axis of rotation of hinge 304.

The lever 308 of the hinge assembly 110 may conceal the hinge assembly 110 within the base member 104 of the computing device 100 (e.g., cavity 202) as the computing device 100 is closed. Similarly, the lever 308 of the hinge assembly 110 may cause the assembly 110 to emerge from the cavity 202 as the computing device 100 is opened. The simultaneous linear and rotational movement of the hinge assembly 110 may allow for the computing device 110 to be opened and closed in a single motion. As an example, the hinge assembly 110 may use two levers 308, mounted symmetrically about the centerline of the base member (e.g., see FIG. 3). The opposite ends of each lever 308 may be positioned as far away from the centerline in order to reduce racking. However, any number of levers 308 may be used for the hinge assembly 110.

It is appreciated that examples described herein below may include various components and features. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A hinge assembly for a computing device, the hinge assembly comprising:
   a sliding portion attached to a base member of the computing device;
   a hinge pivotally connected to the sliding portion and is connectable to a display member of the computing device along an axis, wherein the sliding portion is movable from a first position along the base member to a second position along the base member when the hinge pivots around the axis;
   a lever connected between the hinge and the base member; and
   a ball joint attaching a first end of the lever to the base member is to slide along the lever as a second end of the lever attached to the hinge is to rotate in a circular motion around the axis and to permit the sliding portion to move from the first position to the second position.

2. The hinge assembly of claim 1, comprising:
   the lever attached to the hinge and the base member via ball joints, wherein the ball joint attaching the lever to the hinge is fixed to the lever.

3. The hinge assembly of claim 2, wherein the sliding portion includes an opening through which the lever passes, wherein the opening is disposed between attachments the lever makes with the hinge and the base member via the ball joints.

4. The hinge assembly of claim 2, wherein the lever is attached to the hinge at an offset from the axis, such that when the hinge pivots around the axis, the second end of the lever attached to the hinge is to rotate in the circular motion around the axis.

5. The hinge assembly of claim 4, wherein when the hinge pivots around the axis, the lever is to push against the base member via the ball joint attaching the lever to the base member, moving the sliding portion from the first position to the second position.

6. The hinge assembly of claim 1, wherein the sliding portion moves from the first portion to the second portion via guide tracks disposed within the base member.

7. A computing device, comprising:
   a base member;
   a hinge assembly, comprising:
      a sliding portion attached to the base member, wherein the sliding portion is movable from a first position along the base member to a second position along the base member;
      a lever;
      a ball joint attaching a first end of the lever to the base member is to slide along the lever as a second end of the lever attached to a hinge is to rotate in a circular motion around an axis and a to permit the sliding portion to move from the first position to the second position when the hinge pivots around the axis; and
   a display member attached to the hinge assembly.

8. The computing device claim 7, wherein the hinge assembly comprises the lever attached to the hinge and the base member via ball joints, wherein the ball joint attaching the lever to the hinge is fixed to the lever.

9. The computing device of claim 8, wherein the sliding portion includes an opening through which the lever passes, wherein the opening is disposed between attachments the lever makes with the hinge and the base member via the ball joints.

10. The computing device of claim 8, wherein the lever is attached to the hinge at an offset from the axis, such that when the hinge rotates, the second end of the lever attached to the hinge is to rotate in the circular motion around the axis.

11. The computing device of claim 10, wherein when the hinge rotates, the lever is to push against the base member via the ball joint attaching the lever to the base member, moving the sliding portion from the first position to the second position.

12. A hinge assembly for a computing device, the hinge assembly comprising:
    a sliding portion attached to a base member of the computing device;
    a hinge pivotally connected to the sliding portion and is connected to a display member of the computing device along an axis, wherein the sliding portion moves from a first position along the base member to a second position along the base member when the hinge pivots around the axis; and
    a lever include a first end and a second end, the lever attached between the hinge and the base member via ball joints, wherein a ball joint attaching the lever to the hinge is fixed to the lever and a ball joint attaching the lever to the base member is to slide along the lever as the second end of the lever attached to the hinge is to rotate in a circular motion around the axis and to permit the sliding portion to move from the first position to the second position.

13. The hinge assembly of claim 12, wherein the lever is attached to the hinge at an offset from the axis, such that when the hinge pivots around the axis, the second end of the lever attached to the hinge is to rotate in the circular motion around the axis.

14. The hinge assembly of claim 13, wherein when the hinge pivots around the axis, the lever is to push against the base member via the ball joint attaching the lever to the base member, moving the sliding portion from the first position to the second position.

* * * * *

UNITED STATES PATENT AND TRADEMARK OFFICE
CERTIFICATE OF CORRECTION

PATENT NO. : 10,234,908 B2
APPLICATION NO. : 15/304934
DATED : March 19, 2019
INVENTOR(S) : Mark Senatori et al.

Page 1 of 1

It is certified that error appears in the above-identified patent and that said Letters Patent is hereby corrected as shown below:

On the Title Page

In item (57), Abstract, in Column 2, Line 2, delete "binge" and insert -- hinge --, therefor.

In the Claims

In Column 6, Line 5, in Claim 7, delete "a to" and insert -- to --, therefor.

In Column 6, Line 10, in Claim 8, after "device" insert -- of --.

Signed and Sealed this
Fourth Day of June, 2019

Andrei Iancu
*Director of the United States Patent and Trademark Office*